United States Patent [19]
Saunders

[11] Patent Number: 5,574,467
[45] Date of Patent: Nov. 12, 1996

[54] DOPPLER POSITIONING USING NON-PLANAR MOVEMENT OF TRANSMITTING SOURCE AND RECEIVING SOURCE

[75] Inventor: Steven E. Saunders, Cupertino, Calif.

[73] Assignee: Interval Research Corporation, Palo Alto, Calif.

[21] Appl. No.: 401,171

[22] Filed: Mar. 9, 1995

[51] Int. Cl.⁶ ........................................................ G01S 1/44
[52] U.S. Cl. .............................. 342/398; 342/400; 342/428
[58] Field of Search .................................... 342/398, 400, 342/402, 405, 418, 428, 430

[56] References Cited

U.S. PATENT DOCUMENTS

| | | |
|---|---|---|
| 3,972,044 | 7/1976 | Alford . |
| 3,988,733 | 10/1976 | Kohler . |
| 3,999,187 | 12/1976 | Johnson . |
| 4,288,794 | 9/1981 | Osborne et al. . |
| 4,382,259 | 5/1983 | Becavin et al. . |
| 4,417,250 | 11/1983 | Grousseau . |
| 4,423,420 | 12/1983 | Krajewski ............................... 342/400 |
| 4,434,423 | 2/1984 | Kautz . |
| 4,591,861 | 5/1986 | Kautz . |
| 4,644,358 | 2/1987 | Sekine ..................................... 342/356 |
| 5,241,313 | 8/1993 | Shaw et al. . |

*Primary Examiner*—Theodore M. Blum
*Attorney, Agent, or Firm*—Brooks & Kushman

[57] ABSTRACT

Methods and systems for determining a position and an orientation utilize a radio frequency signal transmitted from an effective source location which moves along a first closed, non-planar path. The closed, non-planar path has a plurality of local extreme points with respect to a predetermined axis. The radio frequency signal is received at an effective receiving location which may, optionally, move along a second closed, non-planar path. A phase signal representative of the phase of the received radio frequency signal is detected. The phase signal is filtered and processed to form at least one signal quantity representative of elevation, bearing, and/or orientation.

54 Claims, 5 Drawing Sheets

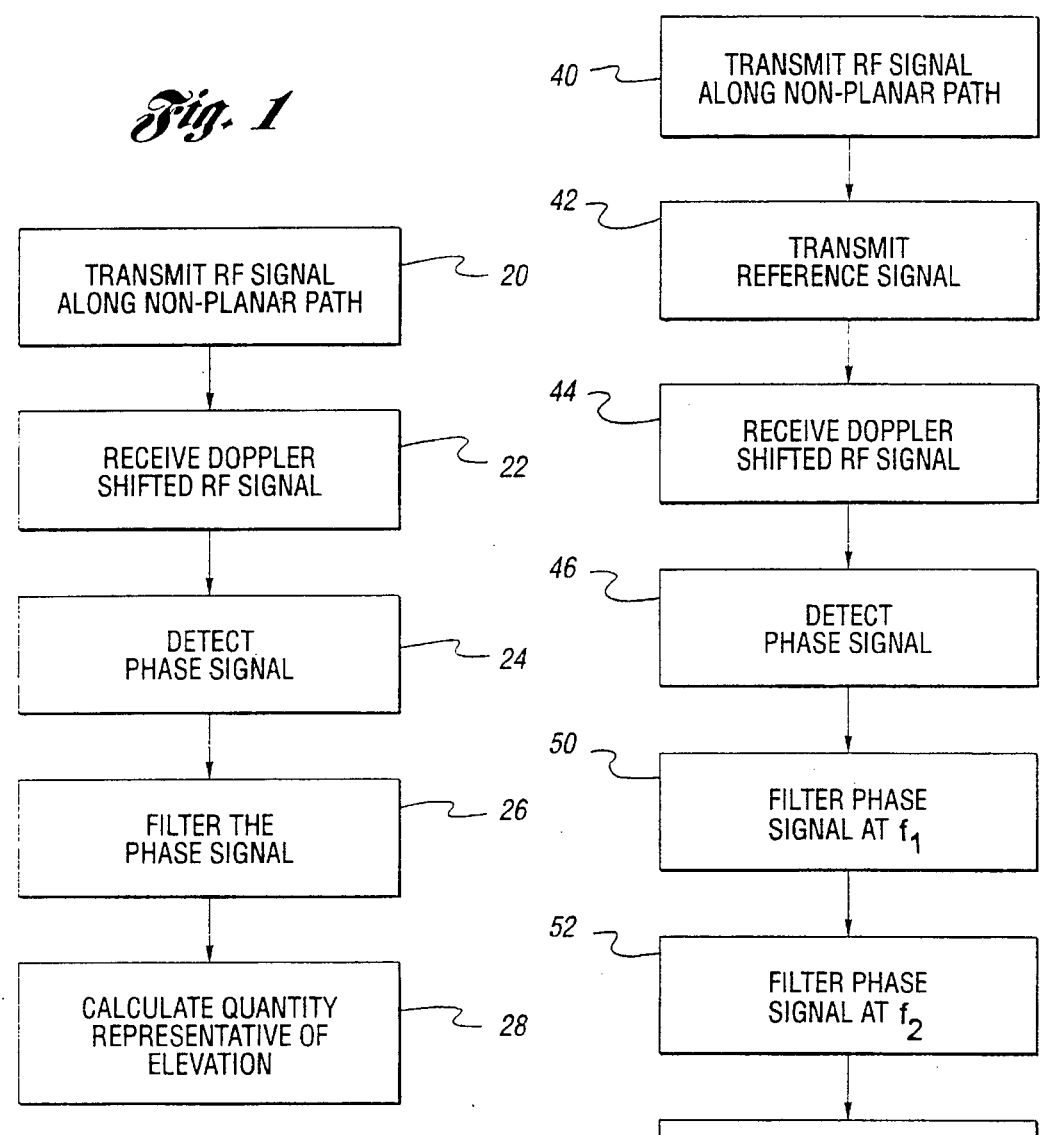

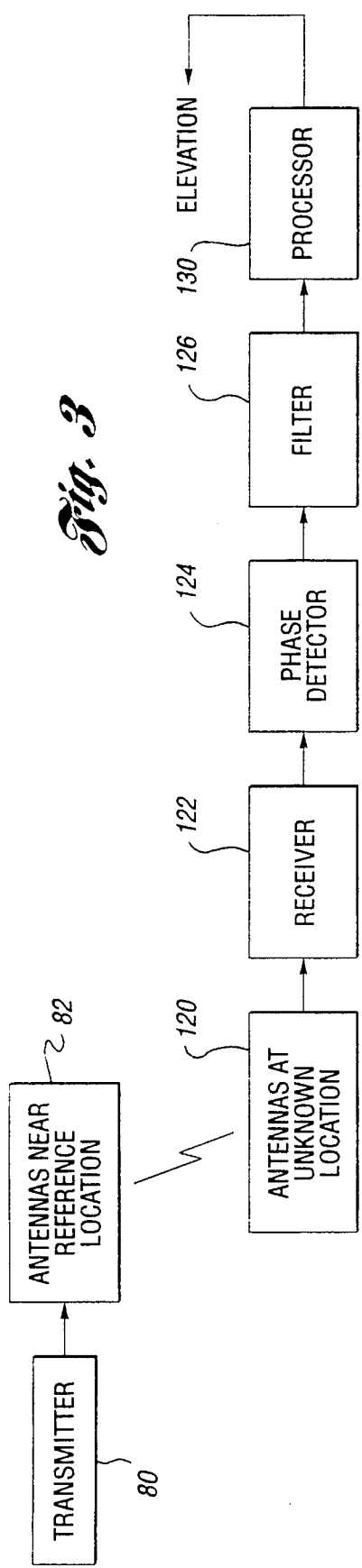
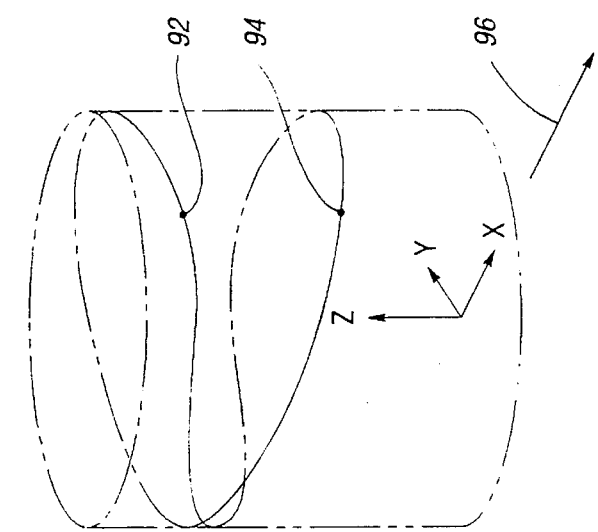
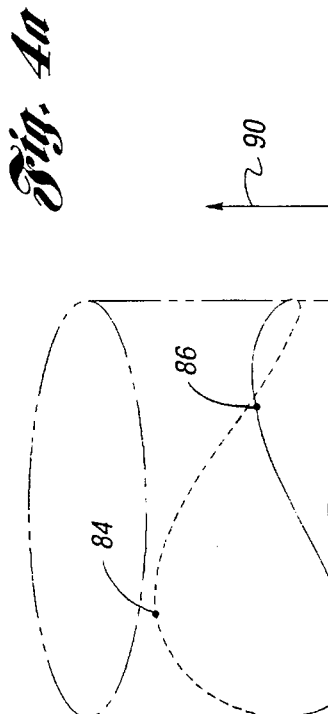
Fig. 3
Fig. 4a
Fig. 4b

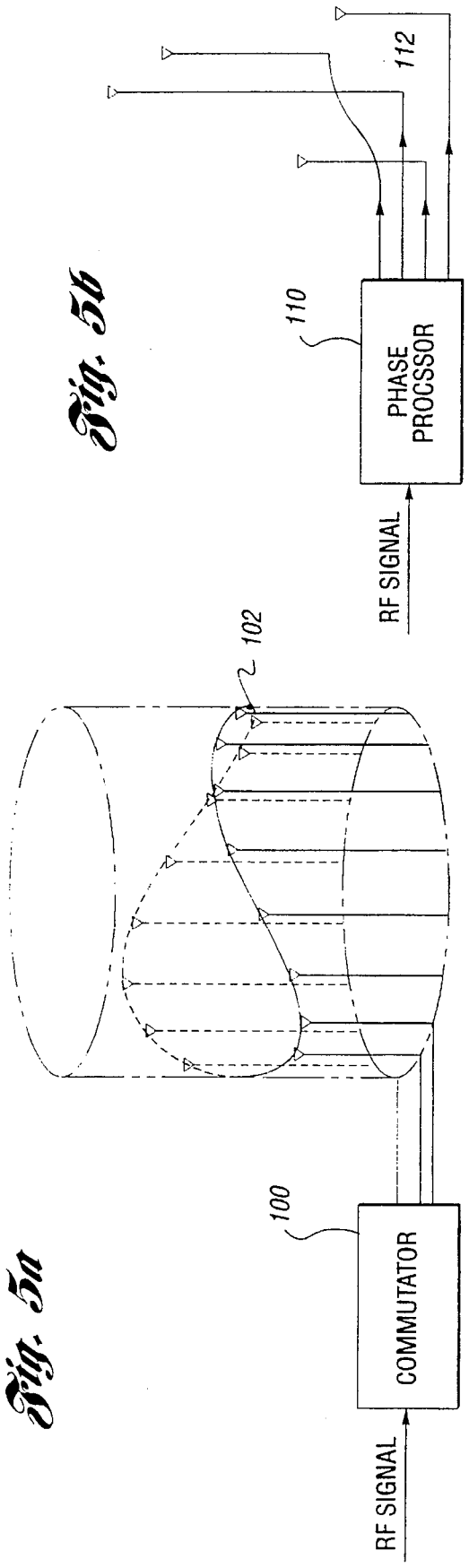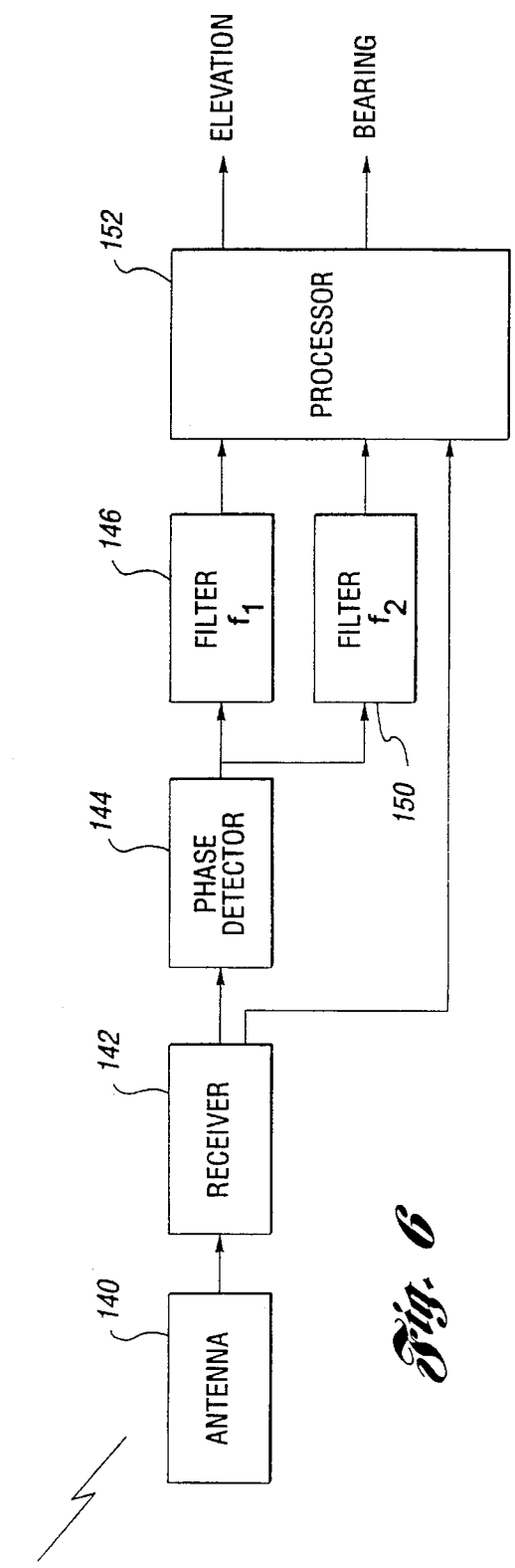

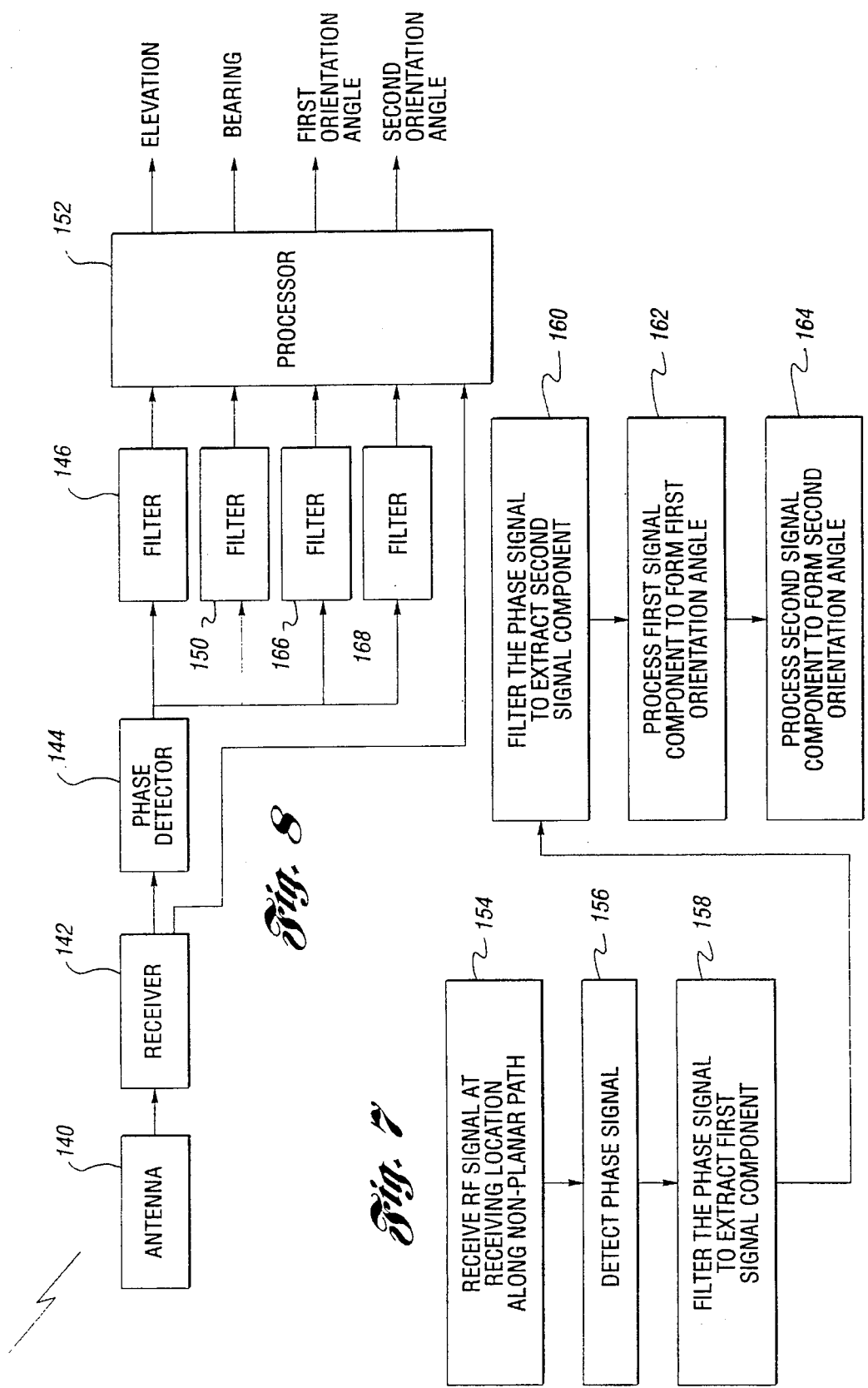

DOPPLER POSITIONING USING NON-PLANAR MOVEMENT OF TRANSMITTING SOURCE AND RECEIVING SOURCE

TECHNICAL FIELD

The present invention relates to methods and systems of determining at least one pose quantity using Doppler-induced phase modulation.

BACKGROUND OF THE INVENTION

Very high frequency omnidirectional ranging (VOR) systems have been employed for many years to provide bearing information in various applications. In a conventional VOR system used for aircraft navigation, a transmitted signal emanating from a ground antenna is effectively directed around a circular path at a rate of 30 times per second. A 9,960 Hz tone, which is frequency modulated by a 30 Hz reference tone, modulates the amplitude of a continuous wave signal to form the transmitted signal. An aircraft receiving the transmitted signal computes a bearing quantity based upon the phase difference between the 30 Hz reference tone and the 30 Hz amplitude modulation provided by the rotating directivity of the antenna.

In a Doppler VOR system used for aircraft navigation, an effective source location of a ground antenna pattern repeatedly cycles around a closed, planar path. In practice, a circular array of antennas is employed at a ground station, wherein each antenna is sequentially connected to a transmitter in order to simulate the rotation of a single antenna around the circle at a rate of 30 times per second. An aircraft receives a Doppler-shifted signal having a phase angle proportional to the bearing of the aircraft. By further receiving a transmitted reference signal containing a 30 Hz reference tone, the aircraft can determine the bearing.

U.S. Pat. No. 3,999,187 to Johnson discloses a Doppler VOR beacon having a plurality of omnidirectional antennas disposed around the periphery of a circle centered on a central antenna. Further included are means for commutating a source of sideband radiation around the plurality of omnidirectional antennas to simulate a rotating source, and means for radiating from the central antenna carrier power modulated with a reference wave.

U.S. Pat. No. 4,591,861 to Kautz discloses a double-sideband Doppler VOR system having plurality of antennas arranged equidistantly on a circle. Two opposite antenna pairs are simultaneously activated by a commutator in a manner to simulate a uniform rotation of an active antenna.

Other patents which disclose Doppler VOR systems employing a circular arrangement of transmitting antennas include U.S. Pat. No. 3,972,044 to Alford, U.S. Pat. No. 3,988,733 to Kohler, U.S. Pat. No. 4,382,259 to Becavin et al., U.S. Pat. No. 4,417,250 to Grousseau, and U.S. Pat. No. 4,434,423 to Kautz.

SUMMARY OF THE INVENTION

It is an object of the present invention to provide methods and systems for Doppler ranging which determine an elevation quantity.

Another object of the present invention is to provide methods and systems for Doppler ranging which simultaneously determine an elevation quantity and a bearing quantity.

A further object is to provide methods and systems for Doppler ranging which determine at least one orientation quantity.

In carrying out the above objects, the present invention provides a method of determining the relative position of a first location relative to a reference location. A radio frequency signal is transmitted from an effective source location which moves along a closed, non-planar path having a plurality of local extreme points with respect to a predetermined axis. The effective source location passes through successive ones of the extreme points at a predetermined frequency. The radio frequency signal is received at a location proximate to the first location. A phase signal representative of the phase of the received radio frequency signal is detected. The phase signal is filtered to extract a signal component at the predetermined frequency. The signal component is processed to form a signal representative of the elevation of the first location relative to the reference location.

Further in carrying out the above objects, the present invention provides a method of determining an orientation of an object. A radio frequency signal having a received phase is received at an effective receiving location proximate to the object. The effective receiving location moves along a closed, non-planar path having a plurality of local extreme points with respect to a predetermined axis. The effective receiving location passes through successive ones of the extreme points at a predetermined frequency. A phase signal representative of the received phase of the radio frequency signal is detected. The phase signal is filtered to extract a signal component at the predetermined frequency. The signal component is processed to form a signal representative of the orientation of the object.

Still further in carrying out the above objects, systems are provided which perform the steps of the above-mentioned methods.

These and other features, aspects, and advantages of the present invention will become better understood with regard to the following description, appended claims, and accompanying drawings.

BRIEF DESCRIPTION OF THE DRAWINGS

FIG. 1 is a flow chart of an embodiment of a method of determining the position of a first location relative to a reference location in accordance with the present invention;

FIG. 2 is a flow chart of another embodiment of a method of determining the position of a first location relative to a reference location in accordance with the present invention;

FIG. 3 is a block diagram of an embodiment of a system for determining the position of a first location relative to a reference location in accordance with the present invention;

FIGS. 4A and 4B illustrate examples of non-planar paths in accordance with the present invention;

FIGS. 5A and 5B schematically illustrate embodiments of systems for moving an effective antennal location along a non-planar path;

FIG. 6 is a block diagram of another embodiment of a system for determining the position of a first location relative to a reference location in accordance with the present invention;

FIG. 7 is a flow chart of an embodiment of a method of determining an orientation of an object;

FIGS. 8 is a block diagram of an embodiment of a system for determining four independent pieces of pose information.

BEST MODES FOR CARRYING OUT THE INVENTION

Figure 9A:
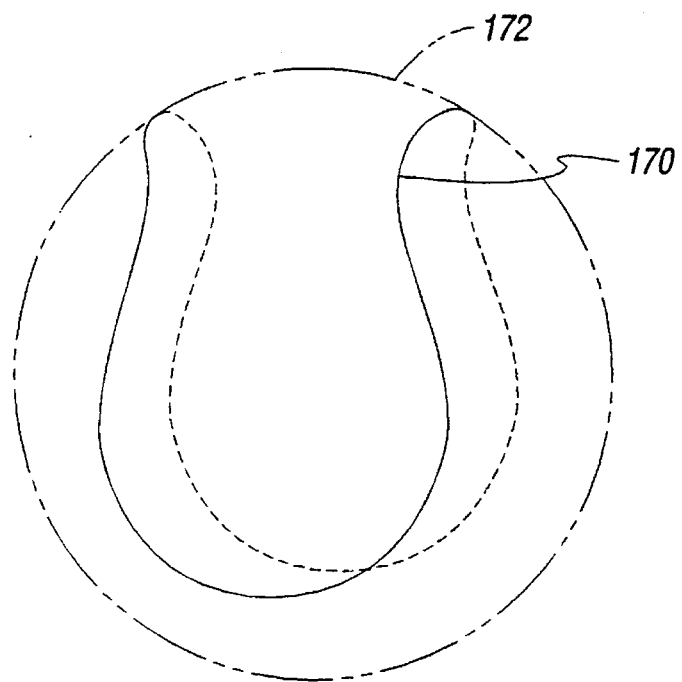
FIGS. 9A and 9B illustrate two alternative families of closed, non-planar paths in accordance with the present invention.

FIG. 1 is a flow chart of an embodiment of a method of determining the relative position of a first location with respect to a reference location. The method includes a step of transmitting a radio frequency signal from an effective source location which moves along a closed, non-planar path having a plurality of local extreme points with respect to a predetermined axis, the step indicated by block 20. Preferably, the closed non-planar path is in proximity to the reference location, and the effective source location repeatedly cycles around the entire path at a predetermined frequency. Also in a preferred embodiment, the radio frequency signal includes a continuous wave sinusoidal signal, which preferably is either a 900 MHz or a 2.1 GHz communication band signal. Alternatively, a VHF (very high frequency) signal may be utilized for the radio frequency signal. The closed, non-planar path is selected such that the effective source passes through successive ones of the extreme points at another predetermined frequency.

The method further includes a step of receiving the radio frequency signal at a location generally near to the first location, as indicated by block 22. Since the effective source location is moving with respect to the receiving location, the received radio frequency signal is doppler-shifted. The doppler shift in the received radio frequency signal is dependent upon the oscillation frequency of the radio frequency signal, the radial component of the instantaneous velocity between the receiving location and the effective source location, and the speed of light in the transmission medium.

As indicated by block 24, the method includes a step of detecting a phase signal representative of the phase of the received radio frequency signal. As one with ordinary skill in the art will recognize, the phase signal can alternatively comprise a frequency deviation signal. The phase signal contains information which relates the relative position of the first location with respect to the reference location based upon a doppler-induced phase shift, or equivalently, a doppler-induced frequency deviation.

The method further includes a step of filtering the phase signal to extract a signal component at the predetermined frequency which the effective source location passes through successive ones of the extreme points, as indicated by block 26. This step of filtering acts to extract the information in the doppler-induced phase shift related to the elevation of the first location with respect to the second location.

As indicated by block 30, the method includes a step of processing the signal component to form a quantity, in the form of a signal, representative of the elevation of the first location with respect to the reference location. As one with ordinary skill in the art will recognize, the quantity representative of elevation can comprise an absolute measure of elevation, a relative measure of elevation, an angular measure of elevation, or any like measure based upon the elevation.

Another embodiment of a method of determining the relative position of a first location with respect to a reference location is illustrated in FIG. 2. As indicated by block 40, the method includes a step of transmitting a radio frequency signal from an effective source location which moves along a closed, non-planar path having a plurality of local extreme points with respect to a predetermined axis. As described earlier, the path is preferably in proximity to the reference location, and the effective source location preferably cycles around the entire path at a predetermined frequency. The predetermined axis, in which the plurality of local extreme points are based, is arbitrary. For example, the predetermined axis can be a generally vertical axis, or alternatively, the predetermined axis can be a generally horizontal axis.

The method also includes a step of transmitting a reference signal at a location in proximity to the reference location, as indicated by block 42. The reference signal indicates when the effective source location is at a predetermined location on the path. Examples of the reference signal include: a pulsed signal wherein a signal transition occurs when the effective source location is at the predetermined location on the path, an amplitude modulated signal wherein the amplitude of the signal is based upon the location of the effective source along the path, or a frequency modulated signal wherein the frequency of the signal is modulated based upon the location of the effective source along the path. In a preferred embodiment, a frequency modulated signal is employed for the reference signal.

A step of receiving the radio frequency signal at a location generally near the first location is then performed, as indicated by block 44. The received radio frequency signal includes a doppler-induced phase shift and frequency deviation which results from the effective source location moving along the closed, non-planar path.

As indicated by block 46, the method further includes a step of detecting a phase signal representative of the doppler-induced phase of the received radio frequency signal. As mentioned earlier, the phase signal may be measured in terms of either phase, frequency deviation, or absolute frequency.

A step of filtering the phase signal to extract a signal component at the predetermined frequency which the effective source location cycles around the entire path is performed, as indicated by block 50. A similar step is performed in block 52, wherein the phase signal is filtered to extract a second signal component at the predetermined frequency, which the effective source location passes through successive ones of the extreme points. The two predetermined frequencies are represented by the variables $f_1$ and $f_2$.

In block 54, a step of receiving the reference signal at a location generally near the first location is performed. The reference signal is employed in a subsequent step of determining the bearing of the first location with respect to the reference location.

The method further performs a step of processing the first signal component at the predetermined frequency $f_1$ to form a first quantity representative of the elevation of the first location with respect to the reference location, as indicated by block 56. The first quantity is preferably in the form of an electrical signal.

The method also includes a step of processing the second signal component at the predetermined frequency $f_2$ and the received reference signal to form a second quantity representative of the bearing of the first location with respect to the second location, as indicated by block 60. The second quantity may be formed in dependence upon the magnitude of the second signal component at the time the received reference signal indicates the effective source location is at a predetermined location on the path. Preferably, the second quantity is formed in dependence upon the relative phase of the second signal component with respect to the received reference signal. By comparing the phase of the entire reference signal with respect to the phase of the entire second Signal component, rather than an instantaneous magnitude of the second signal component, a more robust estimate of the second quantity is formed in the presence of noise. Preferably, the second quantity is in the form of an electrical signal.

As a result of employing a non-planar path, the embodiment of the method of FIG. 2 is capable of simultaneously providing quantities representative of elevation and bearing.

FIG. 3 is a block diagram of an embodiment of a system for determining the position of a first location relative to a reference location in accordance with the present invention. The system includes a transmitter 80 coupled to antennas 82 which transmits a radio frequency signal from an effective source location which moves along the closed, non-planar path. The closed, non-planar path has a plurality of local extreme points with respect to a predetermined axis. Examples of such non-planar paths in accordance with the present invention are illustrated in FIGS. 4A and 4B.

FIG. 4A illustrates a closed, non-planar path having two local extreme points 84 and 86 with respect to a predetermined axis 90, which is a generally vertical axis. In comparison, FIG. 4B illustrates a closed, non-planar path having two local extreme points 92 and 94 with respect to a generally horizontal predetermined axis 96.

FIGS. 5A and 5B schematically illustrate embodiments of systems for transmitting the radio frequency signal from an effective source location which moves along the closed, non-planar path.

In FIG. 5A, a radio frequency signal, which preferably includes a continuous wave sinusoidal signal component, is applied to a commutator 100. The commutator 100 selectively applies the radio frequency signal to at least one of a plurality of antennas 102 which are located along the path. The antennas 102 illustrated in FIG. 5A are arranged to coincide with the non-planar path of FIG. 4A. By selectively applying the radio frequency signal to successive ones of the antennas 102, the effective source location can be moved along the path. Preferably, a linear interpolation operation is employed between successive ones of the antennas 102 so that the effective source location moves smoothly along the path.

In FIG. 5B, a radio frequency signal, which preferably includes a continuous wave sinusoidal signal component, is applied to a phase processor 110. The outputs of the phase processor are coupled to an array of antennas 112, which forms a phased antenna array as is known in the art. By modifying the amplitude and/or the phase of the radio frequency signal for application to each of the array of antennas 112, the radio frequency signal can be effectively located at a desired location on the path, and more particularly can be cycled around the desired non-planar path. Further, the phased antenna array allows the directivity of the radio frequency signal to be steered in a desired direction. In one embodiment, the antennas 112 are arranged as vertices of a tetrahedron.

Referring back to FIG. 3, the radio frequency signal transmitted by the antennas 82 are received by an antenna 120 which is located generally near to the first location. The antenna 120 provides the radio frequency signal to a receiver 122. The receiver 122 may include amplification stages, filtering stages, and other signal processing stages as is known in the art. The receiver 122 is coupled to a phase detector 124. The phase detector 124 detects a phase signal representative of the phase of the received radio frequency signal. Preferably, the phase detector 124 includes a phase locked loop.

A filter 126 is coupled to the output of the phase detector 124. The filter 126, which is preferably a bandpass filter, filters the phase signal to extract a signal component at the predetermined frequency $\omega_1$. Alternatively, the filter 126 can be a high-pass filter or a low-pass filter based upon the specific non-planar path employed.

The output of the filter 126 is applied to a processor 130. The processor 130 calculates a quantity representative of the elevation of the first location with respect to the reference location, wherein the quantity is calculated based upon the filtered signal component. The processor 130 can have a digital implementation using a microprocessor and a memory, wherein the microprocessor performs a sequence of programmed steps. Alternatively, the processor 130 can have an analog implementation using standard means for performing analog computations.

FIG. 6 is a block diagram of another embodiment of a system for determining the position of a first location relative to a reference location in accordance with the present invention. The transmitted radio frequency signal is received by a combination of an antenna 140 and a receiver 142. A phase signal representative of the phase of the received radio frequency signal is produced by a phase detector 144 coupled to the receiver 142. The phase signal from the phase detector 144 is applied to a filter 146. The filter 146, which is preferably a bandpass filter, filters the phase signal to extract a signal component based upon the frequency at which the effective source location passes through successive ones of the extreme points. The phase signal is also provided to a filter 150. The filter 150, which is also preferably a bandpass filter, filters the phase signal to extract a second signal component at the frequency at which the effective source location cycles around the entire path.

The outputs of the filters 146 and 150 are applied to a processor 152. The processor 152 calculates a quantity representative of the elevation of the first location with respect to the reference location based upon the output of the filter 146. The processor 152 further calculates a quantity representative of the bearing of the first location with respect to the reference location based upon the output of the filter 150 and the reference signal received by the antenna 140 and the receiver 142.

The above-described methods and systems are capable of providing two independent pieces of pose information, namely, the elevation and the bearing, of an object located proximate to the receiving location. Further independent pieces of pose information related to the orientation of the object may be obtained by moving an effective receiving location along a closed, non-planar path as described for the effective source location. By moving both the effective source location and the effective receiving location along two closed, non-planar paths, four independent pieces of pose information may be obtained.

FIG. 7 is a flow chart of an embodiment of a method of determining an orientation of an object. The method includes a step of receiving a radio frequency signal at an effective receiving location proximate to the object, as indicated by block 154. The radio frequency signal is transmitted from an effective source location which may be employed as a reference location for determining the orientation of the object. The effective receiving location moves along a closed, non-planar path having a plurality of local extreme points with respect to a predetermined axis. Preferably, the predetermined axis is fixed with respect to the object. The effective receiving location passes through successive ones of the extreme points at a first predetermined frequency. Further, the effective receiving location repeatedly cycles around the path at a second predetermined frequency.

As indicated by block 156, the method further includes a step of detecting a phase signal representative of the received phase of the radio frequency signal. A step of filtering the phase signal, as indicated by block 158, to extract a first signal component at the first predetermined frequency is performed. Optionally, a step of filtering the phase signal to extract a second signal component at the second predetermined frequency is performed, as indicated by block 160.

As indicated by block 162, the method further includes a step of processing the first signal component to form a first signal representative of the orientation of the object. Optionally, the method further includes a step, as indicated by block 164, of processing the second signal component to form a second signal representative of the orientation of the object. Here, the method may further comprise a step of generating a reference signal indicative of the effective receiving location, wherein the second signal is based upon a phase comparison between the second signal component and the reference signal.

An embodiment of a system for determining an orientation of an object is described using the block diagram in FIG. 3. Here, the antenna 120 is capable of providing an effective receiving location which moves along a closed, non-planar path having a plurality of local extreme points with respect to a predetermined axis. The effective receiving location may be moved along the path using a commutator as illustrated in FIG. 5A or phased array antennas as illustrated in FIG. 5B.

The radio frequency signal received by the receiver 122 has a received phase which is modulated as a result of the moving effective receiving location. The phase detector 124 detects a phase signal representative of the received phase of the radio frequency signal. The filter 126 filters the phase signal to extract a first signal component at the frequency at which the effective receiving location passes through successive ones of the extreme points. The processor 130 processes the first signal component to form a first signal representative of the orientation of the object.

Another embodiment of a system for determining an orientation of an object may be described using the block diagram in FIG. 6. This embodiment further includes the filter 150 which filters the phase signal to extract a second signal component at the frequency at which the effective receiving location repeatedly cycles around the path. The processor 152 processes the second signal component to form a second signal representative of the orientation of the object. This embodiment provides two independent pieces of information related to the orientation of the object.

If the effective source location moves along a first closed, non-planar path, and the effective receiving location moves along a second closed, non-planar path, then the embodiment of FIG. 6 may be modified to determine four independent pieces of pose information. Such an embodiment is illustrated by the block diagram in FIG. 8. Two additional filters 166 and 168 (in addition to the filters 146 and 150) are coupled to the phase detector 144 to provide selected signal components to the processor 152. The processor 152 utilizes the selected signal components to form four independent pieces of pose information, namely, an elevation quantity, a bearing quantity, and two orientation quantities (i.e., two attitude angle quantities).

A brief analysis of embodiments of the present invention is now given with regard to a particularly advantageous family of closed, non-planar paths for the effective source location and/or the effective receiving location. This family of paths can be described by the following set of parametric equations:

$$x = r\,sin(\omega_1 t)$$

$$y = r\,cos(\omega_1 t)$$

$$z = k_1 + k_2\,cos(\omega_2 t)$$

where (x,y,z) is the effective location of the antenna (either for transmitting or receiving) in rectangular coordinates, t is representative of time, and $\omega_1$, $\omega_2$, $k_1$, $k_2$, and r are constants.

Two paths which are members of this family are illustrated in FIGS. 4A and 4B. FIG. 4A illustrates a path where $\omega_2$ is selected to be two times the value of $\omega_1$. Consequently, for FIG. 4A, $\omega_1$ is the predetermined frequency at which the effective location cycles around the entire path, and $\omega_2$ is the predetermined frequency at which the effective location passes through successive ones of the extreme points 84 and 86.

In FIG. 4B, $\omega_1$ is selected to be twice the value of $\omega_2$. Consequently, for FIG. 4B, $\omega_1$ is the predetermined frequency at which the effective location passes through successive ones of the extreme points 92 and 94, and $\omega_2$ is the predetermined frequency at which the effective location cycles around the entire path. As is readily apparent, the predetermined axis in which the plurality of local extreme points are based depends upon the relative values of $\omega_1$ and $\omega_2$.

For the purpose of this analysis, the effective location of the other antenna (receiving or transmitting) is assumed to be at a fixed location, denoted by $(x_0, y_0, z_0)$. The distance, denoted by the variable D, between the effective source location and the effective receiving location, can be found from the following equation:

$$D = [(x(t) - x_0)^2 + (y(t) - y_0)^2 + (z(t) - z_0)^2]^{1/2}$$

The radial component of the instantaneous velocity between the effective receiving location and the effective source location can be found by taking the derivative of D with respect to time.

The following three equations illustrate steps of substituting the values of x, y, and z based upon the $$\frac{dD}{dt} = \frac{(x(t) - x_0)\frac{dx}{dt} + (y(t) - y_0)\frac{dy}{dt} + (z(t) - z_0)\frac{dz}{dt}}{D(t)}$$

above-mentioned parametric equations, and simplifying the expression for the time derivative of D.

$$\frac{dD}{dt} = [(r\sin\omega_1 t - x_0) r\omega_1 \cos\omega_1 t + (r\cos\omega_1 t -$$

$$y_0)(-r\omega_1 \sin\omega_1 t) + (k_1 + k_2\cos\omega_2 t - z_0)(-k_2\omega_2\sin\omega_2 t)] \cdot \frac{1}{D}$$

$$\frac{dD}{dt} = \frac{1}{D}\left[ r\omega_1(y_0\sin\omega_1 t - x_0\cos\omega_1 t) + k_2\omega_2(z_0 - k_1)\sin\omega_2 t - \frac{1}{2} k_2^2 \omega_2 \sin(2\omega_2 t) \right]$$

$$\frac{dD}{dt} = \frac{1}{D}\left[ r\omega_1 \sqrt{x_0^2 + y_0^2}\,\sin(\omega_1 t + \phi) + k_2\omega_2(z_0 - k_1)\sin\omega_2 t - \frac{1}{2} k_2^2 \omega_2(2\omega_2 t) \right]$$

As can be seen by the above equation, the time derivative of D has three frequency components: one frequency component at $\omega_1$, another frequency component at $\omega_2$, and a third frequency component at two times $\omega_2$. The frequency component at $\omega_1$ has an amplitude dependent upon the $x_0$ and $Y_0$ quantities. Consequently, the frequency component at $\omega_1$ contains information related to the bearing of the receiving location with respect to the reference location if the effective source location is moving along the path. If the effective receiving location is moving along the path, the frequency component at $\omega_1$ contains information related to the orientation of an object at the receiving location.

The amplitude of the frequency component at $\omega_2$ is dependent upon the variable $z_0$. Consequently, the frequency component at $\omega_2$ contains information related to the elevation of the receiving location with respect to the reference location if the effective source location is moving along the path. If the effective receiving location is moving along the path, the frequency component at $\omega_2$ contains further information related to the orientation.

Since the doppler shift in frequency is proportional to the radial component of the instantaneous velocity between the receiving location and the effective source location, these frequency components are directly observable at the output of the phase detector.

As mentioned earlier, the signal components at $\omega_1$ and $\omega_2$ are preferably obtained using bandpass filters. However, these signal components can also be extracted using high-pass and low-pass filters. For example, if the frequency $\omega_1$ is selected to be less than the frequency $\omega_2$, the signal component at $\omega_1$ can be extracted using a low-pass filter. Similarly, if the frequency $\omega_2$ is selected to be less than the frequency $\omega_1$, the signal component at $\omega_2$ can be extracted using a low-pass filter. In both of these cases, the other signal component can be extracted using a high-pass filter.

Figure 9B:
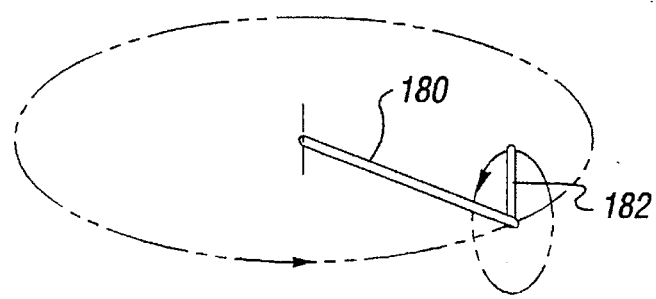

FIGS. 9A and 9B illustrate two alternative families of closed, non-planar paths for the effective source location and/or the effective receiver location. FIG. 9A illustrates a path 170 which is located on the surface of a sphere 172. The path 170 can be described as a path similar to following the seams of a baseball. The path 170 is similar to previously mentioned paths in that it exhibits a plurality of local extreme points with respect to a predetermined axis.

FIG. 9B illustrates an alternative path which can be formed using two rotating arms 180 and 182. The first arm 180 rotates about a generally vertical axis of rotation, and the second arm 182 rotates about an axis coaxial to the axis of the first arm 180. Members of this family of paths are defined by the frequency of rotation of the first arm 180 and the second arm 182. A cycloidal motion of the path can be avoided by selecting the rotational frequency of the second arm 182 to be less than the rotational frequency of the first arm 180 times a constant ratio of the length of the first arm 180 to the length of the second arm 182.

The above-described embodiments of the present invention have many advantages. By moving the transmitting source along a non-planar path, a quantity representative of elevation or elevation angle can be determined in addition to the bearing quantity. By moving the receiving source location along a non-planar path, quantities representative of orientation may be determined. By employing both a moving transmitting source and a moving receiving source, four independent pieces of pose information (bearing, elevation, and two attitude angles) may be obtained.

Further, by employing a frequency modulated reference signal, the resulting system is more immune to variations in the propagation of the reference signal. This is of importance when the reference signal is blocked by an object, for example by the terrain between the transmitting and the receiving antennas, which causes distortion thereof.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A method of determining the position of a first location relative to a reference location using a radio frequency signal transmitted from an effective source location which moves along a closed, non-planar path having a plurality of local extreme points with respect to a predetermined axis, wherein the effective source location passes through successive ones of the extreme points at a first predetermined frequency, the method comprising the steps of:

receiving the radio frequency signal at a location proximate to the first location, the radio frequency signal having a received phase;

detecting a phase signal representative of the received phase of the radio frequency signal;

filtering the phase signal to extract a first signal component at the first predetermined frequency; and processing the first signal component to form a first signal representative of the elevation of the first location relative to the reference location.

2. The method of claim 1 wherein the radio frequency signal includes a continuous wave sinusoidal signal.

3. The method of claim 1 wherein the path is proximate to the reference location.

4. The method of claim 1 wherein the effective source location repeatedly cycles around the path at a second predetermined frequency.

5. The method of claim 4 wherein a reference signal is transmitted at a location proximate to the reference location, and wherein the reference signal is indicative of the effective source location on the path.

6. The method of claim 5 further comprising the steps of:

receiving the reference signal at a location proximate to the first location;

filtering the phase signal to extract a second signal component at the second predetermined frequency; and processing the second signal component and the reference signal to form a second signal representative of the bearing of the first location relative to the reference location.

7. The method of claim 6 wherein the second signal is based upon the magnitude of the second signal component at a time the received reference signal indicates the effective source location is at a predetermined location on the path.

8. The method of claim 6 wherein the second signal is based upon a phase comparison between the second signal component and the reference signal.

9. A system for determining the position of a first location relative to a reference location using a radio frequency signal transmitted from an effective source location which moves along a closed, non-planar path having a plurality of local extreme points with respect to a predetermined axis, wherein the effective source passes through successive ones of the extreme points at a first predetermined frequency, the system comprising:

a receiver which receives the radio frequency signal at a location proximate to the first location, the radio frequency signal having a received phase;

a phase detector, operatively associated with the receiver, which detects a phase signal representative of the received phase of the radio frequency signal;

a first filter, operatively associated with the phase detector, which filters the phase signal to extract a first signal component at the first predetermined frequency; and a processor, operatively associated with the first filter, which processes the first signal component to form a first signal representative of the elevation of the first location relative to the reference location.

10. The system of claim 9 wherein the radio frequency signal includes a continuous wave sinusoidal signal.

11. The system of claim 9 wherein the path is proximate to the reference location.

12. The system of claim 9 wherein the effective source location repeatedly cycles around the path at a second predetermined frequency.

13. The system of claim 12 wherein a reference signal is transmitted at a location proximate to the reference location, and wherein the reference signal is indicative of the effective source location on the path.

14. The system of claim 13 wherein the receiver receives the reference signal at a location proximate to the first location, the system further comprising:

a second filter, operatively associated with the receiver, which filters the phase signal to extract a second signal component at the second predetermined frequency;

wherein the processor is operatively associated with the receiver and the second filter, and wherein the processor processes the second signal component and the reference signal to form a second signal representative of the bearing of the first location relative to the reference location.

15. The system of claim 14 wherein the second signal is based upon the magnitude of the second signal component at a time the reference signal indicates the effective source location is at a predetermined location on the path.

16. The system of claim 14 wherein the second signal is based upon a phase comparison between the second signal component and the reference signal.

17. A method of determining the position of a first location relative to a reference location, the method comprising the steps of:

transmitting a radio frequency signal from an effective source location which moves along a closed, non-planar path having a plurality of local extreme points with respect to a predetermined axis, wherein the effective source passes through successive ones of the extreme points at a first predetermined frequency;

receiving the radio frequency signal at a location proximate to the first location, the radio frequency signal having a received phase;

detecting a phase signal representative of the received phase of the radio frequency signal;

filtering the phase signal to extract a first signal component at the first predetermined frequency; and processing the first signal component to form a first signal representative of the elevation of the first location relative to the reference location.

18. The method of claim 17 wherein the predetermined axis is a generally vertical axis.

19. The method of claim 17 wherein the predetermined axis is a generally horizontal axis.

20. The method of claim 17 wherein the radio frequency signal includes a continuous wave sinusoidal signal.

21. The method of claim 17 wherein the path is proximate to the reference location.

22. The method of claim 17 wherein the effective source location repeatedly cycles around the path at a second predetermined frequency.

23. The method of claim 22 further comprising a step of transmitting a reference signal at a location proximate to the reference location, wherein the reference signal is indicative of the effective source location on the path.

24. The method of claim 23 further comprising the steps of:

receiving the reference signal at a location proximate to the first location;

filtering the phase signal to extract a second signal component at the second predetermined frequency; and processing the second signal component and the reference signal to form a second signal representative of the bearing of the first location relative to the reference location.

25. The method of claim 24 wherein the second signal is based upon the magnitude of the second signal component at a time the received reference signal indicates the effective source location is at a predetermined location on the path.

26. The method of claim 24 wherein the second signal is based upon a phase comparison between the second signal component and the reference signal.

27. A system for determining the position of a first location relative to a reference location, the system comprising:

a transmitter which transmits a radio frequency signal from an effective source location which moves along a closed, non-planar path, having a plurality of local extreme points with respect to a predetermined axis, wherein the effective source location passes through successive ones of the extreme points at a first predetermined frequency;

a receiver which receives the radio frequency signal at a location proximate to the first location, the radio frequency signal having a received phase;

a phase detector, operatively associated with the receiver, which detects a phase signal representative of the received phase of the radio frequency signal;

a first filter, operatively associated with the phase detector, which filters the phase signal to extract a first signal component at the first predetermined frequency; and a processor, operatively associated with the first filter, which processes the first signal component to form a first signal representative of the elevation of the first location relative to the reference location.

28. The system of claim 27 wherein the predetermined axis is a generally vertical axis.

29. The system of claim 27 wherein the predetermined axis is a generally horizontal axis.

30. The system of claim 27 wherein the radio frequency signal includes a continuous wave sinusoidal signal.

31. The system of claim 27 wherein the path is proximate to the reference location.

32. The system of claim 31 wherein the effective source location repeatedly cycles around the path at a second predetermined frequency.

33. The system of claim 32 wherein the transmitter transmits a reference signal at a location proximate to the reference location, and wherein the reference signal is indicative of the effective source location on the path.

34. The system of claim 33 wherein the receiver receives the reference signal at a location proximate to the first location, the system further comprising:

a second filter, operatively associated with the receiver, which filters the phase signal to extract a second signal component at the second predetermined frequency;

wherein the processor is operatively associated with the receiver and the second filter, and wherein the processor processes the second signal component and the reference signal to form a second signal representative of the bearing of the first location relative to the reference location.

35. The system of claim 34 wherein the second signal is based upon the magnitude of the second signal component at a time the reference signal indicates the effective source location is at a predetermined location on the path.

36. The system of claim 34 wherein the second signal is based upon a phase comparison between the second signal component and the reference signal.

37. The system of claim 27 wherein the transmitter includes:

a plurality of antennas located along the path; and a commutator which selectively applies the radio frequency signal to at least one of the antennas so that the effective source location moves along the path.

38. The system of claim 27 wherein the transmitter includes:

a plurality of antennas located in proximity to the path; and a phase processor coupled to the antennas which varies a corresponding phase of the radio frequency signal applied to each of the antennas so that the effective source location moves along the path.

39. A method of determining an orientation of an object, the method comprising the steps of:

receiving a radio frequency signal at an effective receiving location proximate to the object, the radio frequency signal having a received phase, wherein the effective receiving location moves along a closed, non-planar path having a plurality of local extreme points with respect to a predetermined axis, and wherein the effective receiving location passes through successive ones of the extreme points at a first predetermined frequency;

detecting a phase signal representative of the received phase of the radio frequency signal;

filtering the phase signal to extract a first signal component at the first predetermined frequency; and processing the first signal component to form a first signal representative of the orientation of the object.

40. The method of claim 39 wherein the predetermined axis is fixed with respect to the object.

41. The method of claim 39 wherein the radio frequency signal includes a continuous wave sinusoidal signal.

42. The method of claim 39 wherein the effective receiving location repeatedly cycles around the path at a second predetermined frequency.

43. The method of claim 42 further comprising the steps of:

filtering the phase signal to extract a second signal component at the second predetermined frequency; and processing the second signal component to form a second signal representative of the orientation of the object.

44. The method of claim 43 wherein the second signal is based upon a magnitude of the second signal component when the effective receiving location is at a predetermined location on the path.

45. The method of claim 43 further comprising a step of generating a reference signal indicative of the effective receiving location, wherein the second signal is based upon a phase comparison between the second signal component and the reference signal.

46. A system for determining an orientation of an object, the system comprising:

a receiver which receives a radio frequency signal at an effective receiving location which moves along a closed, non-planar path having a plurality of local extreme points with respect to a predetermined axis, the radio frequency signal having a received phase, wherein the effective receiving location passes through successive ones of the extreme points at a first predetermined frequency, and wherein the effective receiving location is proximate to the object;

a phase detector, operatively associated with the receiver, which detects a phase signal representative of the received phase of the radio frequency signal;

a first filter, operatively associated with the phase detector, which filters the phase signal to extract a first signal component at the first predetermined frequency; and a processor, operatively associated with the first filter, which processes the first signal component to form a first signal representative of the orientation of the object.

47. The system of claim 46 wherein the predetermined axis is fixed with respect to the object.

48. The system of claim 46 wherein the radio frequency signal includes a continuous wave sinusoidal signal.

49. The system of claim 46 wherein the effective receiving location repeatedly cycles around the path at a second predetermined frequency.

50. The system of claim 49 further comprising:

a second filter, operatively associated with the phase detector, which filters the phase signal to extract a second signal component at the second predetermined frequency;

wherein the processor is responsive to the second filter, and wherein the processor processes the second signal component to form a second signal representative of the orientation of the object.

51. The system of claim 50 wherein the second signal is based upon the magnitude of the second signal component when the effective receiving location is at a predetermined location on the path.

52. The system of claim 50 further comprising means for generating a reference signal indicative of the effective receiving location, wherein the second signal is based upon a phase comparison between the second signal component and the reference signal.

53. A method of determining a position and an orientation of an object, the method comprising the steps of:

transmitting a radio frequency signal from an effective source location which moves along a closed, non-planar first path, the first path having a plurality of local extreme points with respect to a first predetermined axis, wherein the effective source passes through successive ones of the extreme points at a first predetermined frequency, and wherein the effective source location repeatedly cycles around the first path at a second predetermined frequency;

transmitting a reference signal indicative of the effective source location on the first path;

receiving the radio frequency signal at an effective receiving location proximate to the object, wherein the effective receiving location moves along a closed, non-planar second path having a plurality of local extreme points with respect to a second predetermined axis, wherein the effective receiver location passes through successive ones of the extreme points at a third predetermined frequency, and wherein the effective receiver location repeatedly cycles around the second path at a fourth predetermined frequency, the radio frequency signal having a received phase;

receiving the reference signal at a location proximate to the object;

detecting a phase signal representative of the received phase of the radio frequency signal;

filtering the phase signal to extract a first signal component at the first predetermined frequency;

filtering the phase signal to extract a second signal component at the second predetermined frequency;

filtering the phase signal to extract a third signal component at the third predetermined frequency;

filtering the phase signal to extract a fourth signal component at the fourth predetermined frequency;

processing the first signal component to form a first signal representative of the elevation of the object;

processing the second signal component and the reference signal to form a second signal representative of the bearing of the object;

processing the third signal component to form a third signal representative of the orientation of the object; and processing the fourth signal component to form a fourth signal representative of the orientation of the object.

54. A system for determining a position and an orientation of an object, the system comprising:

a transmitter which transmits a radio frequency signal from an effective source location which moves along a closed, non-planar first path, the first path having a plurality of local extreme points with respect to a first predetermined axis, wherein the effective source passes through successive ones of the extreme points at a first predetermined frequency, and wherein the effective source location repeatedly cycles around the first path at a second predetermined frequency, the transmitter further transmitting a reference signal indicative of the effective source location on the first path;

a receiver which receives the reference signal at a location proximate to the object, the receiver further receiving the radio frequency signal at an effective receiving location proximate to the object, wherein the effective receiving location moves along a closed, non-planar second path having a plurality of local extreme points with respect to a second predetermined axis, wherein the effective receiver location passes through successive ones of the extreme points at a third predetermined frequency, and wherein the effective receiver location repeatedly cycles around the second path at a fourth predetermined frequency, the radio frequency signal having a received phase;

a phase detector, operatively associated with the receiver, which detects a phase signal representative of the received phase of the radio frequency signal;

a first filter, operatively associated with the phase detector, which filters the phase signal to extract a first signal component at the first predetermined frequency;

a second filter, operatively associated with the phase detector, which filters the phase signal to extract a second signal component at the second predetermined frequency;

a third filter, operatively associated with the phase detector, which filters the phase signal to extract a third signal component at the third predetermined frequency;

a fourth filter, operatively associated with the phase detector, which filters the phase signal to extract a fourth signal component at the fourth predetermined frequency; and a processor operatively associated with the receiver, the first filter, the second filter, the third filter, and the fourth filter, wherein the processor processes the first signal component to form a first signal representative of the elevation of the object, wherein the processor processes the second signal component and the reference signal to form a second signal representative of the bearing of the object, wherein the processor processes the third signal component to form a third signal representative of the orientation of the object, and wherein the processor processes the fourth signal component to form a fourth signal representative of the orientation of the object.

* * * * *

UNITED STATES PATENT AND TRADEMARK OFFICE
CERTIFICATE OF CORRECTION

PATENT NO.   : 5,574,467
DATED        : November 12, 1996
INVENTOR(S)  : Saunders It is certified that error appears in the above-identified patent and that said Letters Patent is hereby corrected as shown below:

Column 5, line 2, replace "Signal" with  -- signal --;

Column 8, equation after line 60, delete $$\text{"}\frac{dD}{dt} = \frac{1}{D}\left[r\omega_1 \sqrt{x_0^2 + y_0^2} \sin(\omega_1 t + \phi) + k_2\omega_2 (z_0 - k_1) \sin \omega_2 t - \frac{1}{2} k_2^2 \omega_2 (2\omega_2 t)\right]\text{"}$$

and insert therefor:

$$-\text{-}\frac{dD}{dt} = \frac{1}{D}\left[r\omega_1 \sqrt{x_0^2 + y_0^2} \sin(\omega_1 t + \phi) + k_2\omega_2 (z_0 - k_1) \sin \omega_2 t - \frac{1}{2} k_2^2 \omega_2 \sin(2\omega_2 t)\right]\text{--}$$

Signed and Sealed this

Eighth Day of April, 1997

*Attest:*

BRUCE LEHMAN

*Attesting Officer*        *Commissioner of Patents and Trademarks*